US00RE33903E

United States Patent [19]

Saligny

[11] E Patent Number: Re. 33,903

[45] Reissued Date of Patent: Apr. 28, 1992

[54] SELF-STRIPPING ELECTRICAL CONNECTOR

[75] Inventor: Yves Saligny, Thyez Les Pochons, France

[73] Assignee: Carpano & Pons, Cluses, France

[21] Appl. No.: 569,951

[22] Filed: Aug. 20, 1990

Related U.S. Patent Documents

Reissue of:

[64] Patent No.: 4,767,354
Issued: Aug. 30, 1988
Appl. No.: 47,339
Filed: May 6, 1987

[30] Foreign Application Priority Data

May 6, 1986 [FR] France ..... 86 06724

[51] Int. Cl.[5] ..... H01R 4/24

[52] U.S. Cl. ..... 439/413; 439/97; 439/431

[58] Field of Search ..... 439/389–407, 439/409, 411–419, 723, 727, 790, 791, 795, 797, 798, 431, 92, 97

[56] References Cited

U.S. PATENT DOCUMENTS

| | | | |
|---|---|---|---|
| 2,033,199 | 3/1936 | Lee | 439/727 |
| 2,710,949 | 6/1955 | Happe et al. | 439/92 |
| 2,758,280 | 8/1956 | More | 439/412 |
| 3,945,705 | 3/1976 | Seim et al. | 439/403 |
| 4,080,034 | 3/1978 | Werner | 439/413 |
| 4,262,985 | 4/1981 | Muehlhausen | 439/404 |
| 4,614,396 | 9/1986 | Saligny | 439/395 |
| 4,684,196 | 8/1987 | Smith et al. | 439/411 |

*Primary Examiner*—David L. Pirlot
*Attorney, Agent, or Firm*—Herbert Dubno; Andrew Wilford

[57] ABSTRACT

A self-stripping electrical connector has a grounded bar formed with at least one threaded bore, a dielectric lower support part secured to the bar over the bore and formed with two adjacent outwardly open lower guide passages, a pair of electrically conductive and generally parallel lower tubes having lower ends formed with slots aligned with the respective lower passages and upper ends also formed with slots, and respective guides on the lower support part carrying the tubes for movement toward and away from the bar with the lower-end slots aligned with the respective lower passages. A dielectric upper support part overlies the lower part and is formed with two adjacent outwardly open upper guide passages aligned with the upper-end slots of the respective tubes. A screw is engageable through both of the parts and into the bore of the bar for pressing the upper part down on the lower part and for pressing the tubes down in the lower part and thereby wedging wires in the passages and aligned with the respective slots thereinto.

9 Claims, 4 Drawing Sheets

1

24
4
12
13
26
27
A
10
18
19
14
15
17
16
8
9
22

2

10
4
12
13
26
27
34
L2
33
L3
L1
32
28
A
29
L2
30
5
31
18
19
8
16
17
9
92
22

SELF-STRIPPING ELECTRICAL CONNECTOR

Matter enclosed in heavy brackets [ ] appears in the original patent but forms no part of this reissue specification; matter printed in italics indicates the additions made by reissue.

*This is a reissue application of application Ser. No. 047,339 filed May 6, 1987 U.S. Pat. No. 4,767,354.*

FIELD OF THE INVENTION

The present invention relates to an electrical connector. More particularly this invention concerns such a connector which can connect unstripped wires.

BACKGROUND OF THE INVENTION

A standard connector has at least one electrically conductive connector tube that is carried by a dielectric support and that has opposite ends each formed with a transversely and diametrally throughgoing slot. The width of the slot is slightly smaller than the diameter of the conductor to which the connection is to be made and the tube is thin enough or the slot edges are sharpened such that when an insulated wire is pushed down into the slot parallel to it and the axis of the tube its insulation is cut and the metal tube makes a good electrical connection with the conductive wire core. The support is normally formed with passages aligned with the slots and adapted to hold the insulated wires.

In my U.S. Pat. No. 4,614,396 such a system is described where the connector tube has a first slotted end whose outside dimension measured perpendicular to the tube axis is such that it can penetrate into the opposite slotted end of another such connector element identical to the first one. A guide is used between at least an internal part of the dielectric support and each connector tube on it so as to allow the tubes to move axially but not angularly on the support. An actuating system is provided for each connector tube for moving it individually to push it axially down over the wire it is to connect. It is possible to stack up such tubes for use in a system with several different wires.

Normally this system is provided with a screw which acts on one connector tube or a stack of same. As a result when a plurality of wires are to be interconnected with such a system the necessary maneuvers are fairly tricky. The job is even more onerous when a line must be disconnected or switched because invariably this involves two separate wires which must be individually worked on.

In addition the known devices do not include a convenient ground connection. In many installations a ground lug between two live lines is necessary or at least very handy, for instance for connection of an overvoltage device or lightning arrester. A ground connection is only provided with some difficulty on the known systems.

Objects of the Invention

It is therefore an object of the present invention to provide an improved self-stripping electrical connector.

Another object is the provision of such a self-stripping electrical connector which overcomes the above-given disadvantages, that is which is easy to use and which makes it fairly easy to disconnect and/or reconnect a pair of associated lines.

A further object is to provide a self-stripping electrical connector having between each pair of wires a convenient ground connection.

SUMMARY OF THE INVENTION

A self-stripping electrical connector according to the invention has a grounded bar formed with at least one threaded bore, a dielectric lower support part secured to the bar over the bore and formed with two adjacent outwardly open lower guide passages, a pair of generally parallel lower tubes having lower ends formed with slots aligned with the respective lower passages and upper ends also formed with slots, and respective guides on the lower support part carrying the tubes for movement toward and away from the bar with the lower-end slots aligned with the respective lower passages. A dielectric upper support part overlies the lower part and is formed with two adjacent outwardly open upper guide passages aligned with the upper-end slots of the respective tubes. A screw is engageable through both of the parts and into the bore of the bar for pressing the upper part down on the lower part and for pressing the tubes down in the lower part and thereby wedging wires in the passages and aligned with the respective slots thereinto.

Thus with the system of this invention a single closing device, the screw, forms two connections as it is tightened. Since most household wiring and communications involves related conductor pairs, thus duality has substantial advantages in that it allows one two-conductor line to be connected up at a time in a single operation. Furthermore the tubes do not cant as they are tightened, as in the prior-art systems, since the force resisting closing the device is symmetrical to opposite sides of the screw exerting the closing force.

According to the invention the system has a sleeve or the like for retaining the screw in the upper part against removal therefrom. In addition the connector can have a dielectric intermediate support part secured between the upper and lower parts and a pair of generally parallel upper tubes fixed in the intermediate part having lower ends engageable in the upper ends of the lower tubes and upper ends formed with slots aligned with the respective upper passages and upper ends also formed with slots. The screw passes through the intermediate part between the tubes.

To push off the upper part with the screw, the device has a threaded sleeve surrounding the screw and fixed in the intermediate part and the screw has a head capable of bearing toward the bar on the upper part, a threaded lower end threadedly engageable with the bar and with the threaded sleeve, a small-diameter shank between the head and the threaded end capable of sliding through the sleeve, and a shoulder engageable away from the bar against the upper part on threaded engagement of the threaded end in the sleeve. Thus screwing the threaded end up into the sleeve pushes the upper part off the intermediate part.

This intermediate part can be integrated according to the invention with an overvoltage protector having respective input conductors connected to the upper tubes and an output conductor normally in electrical contact with the screw. This protector is fixed to the intermediate part and in fact the intermediate part is unitarily formed with a housing containing the protector.

DESCRIPTION OF THE DRAWING

The above and other features and advantages will become more readily apparent from the following, it being understood that any feature described with reference to one embodiment of the invention can be used where possible with any other embodiment. In the accompanying drawing.

SPECIFIC DESCRIPTION

Figure 1:
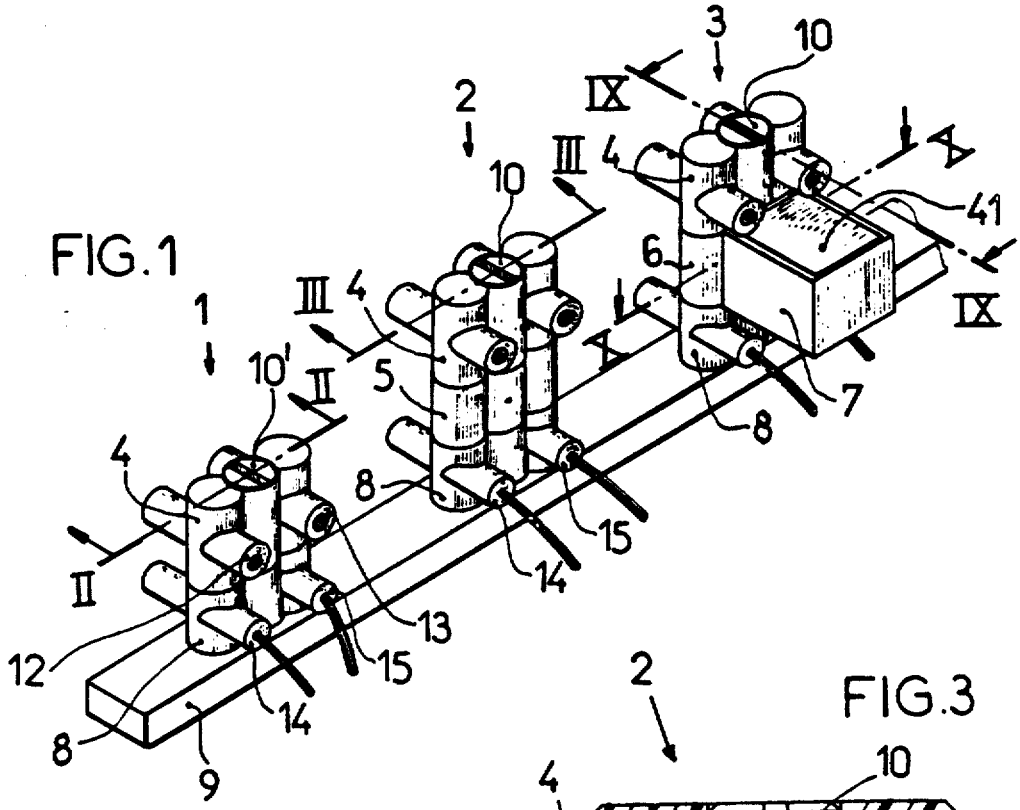
FIG. 1 is a perspective view of three self-stripping connectors according to this invention.

As seen in FIG. 1 a metallic ground/support bar 9 carries three autostripping connectors 1, 2, 3, each comprising a lower part 8 sitting on the bar 9 and an upper part 4. The connector 2 has an intermediate part 5 between its upper and lower parts 4 and 8 and the connector 3 has an intermediate part 6 fitted with a lateral extension 7 for a lightning arrester or the like. The connector 1 is secured to the bar 9 by a short screw 10' and the connectors 2 and 3 by longer screws 10. Each upper part 4 is formed with a pair of guide sleeves 12 and 13 for upper wires 26 and 27 (FIGS. 4 through 7) and each lower part with two sleeves 14 and 15 for lower wires 16 and 17 (FIGS. 2 through 7). In addition each lower part 8 is provided with snap-type barb mounts 11 that engage through holes in the bar 9 and hold it securely in place thereon, even in the absence of the screw 10 or 10'. The connector 1 allows the two upper wires 26 and 27 to be disconnected, but not while remaining anchored in this part 4. The connector 2 allows the two upper wires 26 and 27 to be disconnected while remaining attached together to the part 4. The connector 3 can protect both sides of the line against excessive voltages.

Figure 2:
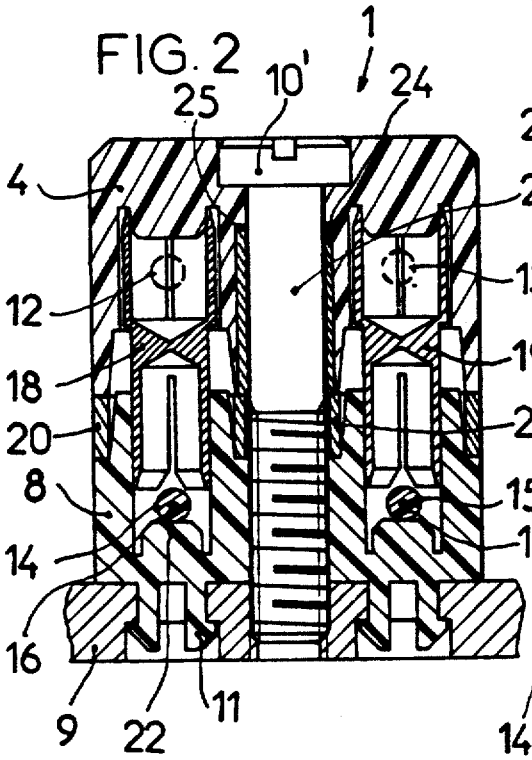
FIGS. 2 and 3 are sections taken respectively along the planes indicated at II—II and III—III of FIG. 1.

The upper and lower parts 4 and 8 contain two metallic split tubes 18 and 19 each with a small-diameter downwardly slotted lower end, with an upwardly slotted upper end of an inside diameter equal to the outside diameter of the lower end, and with a transverse web closing the tubes 18 and 19 between their ends. As seen in FIG. 2 the connector 1 is supplied with two disposable spacer rings 20 and 21 that hold the two tubes 18 and 19 in the illustrated raised position and to prevent an accidental wedging of the lower ends of the tubes 18 and 19 on guide bosses 22 of the lower part 8.

For practical reasons the unthreaded shank 23 of the screw 10' is held in the upper part 4 by means of a metallic sleeve 24 pinched around the shank 23 but rotatable thereon. A shoulder 25 formed in the part 4 engages this sleeve 24, which is too tight to slide off the threads of the bolt 10' and therefore holds the screw 10' captured in this part 4.

Figure 4:
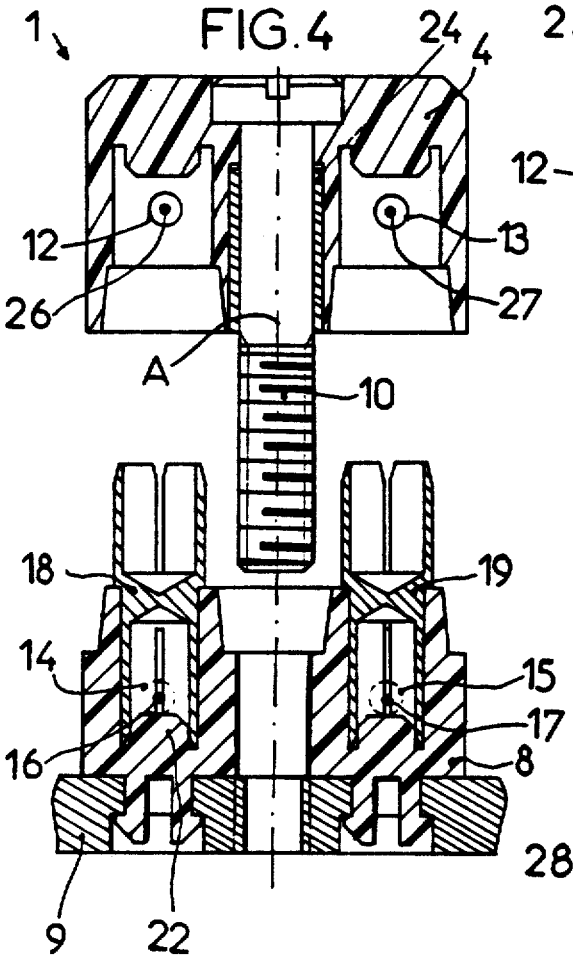
FIGS. 4 and 5 are exploded views of the structure shown respectively in FIGS. 2 and 3.
Figure 6:
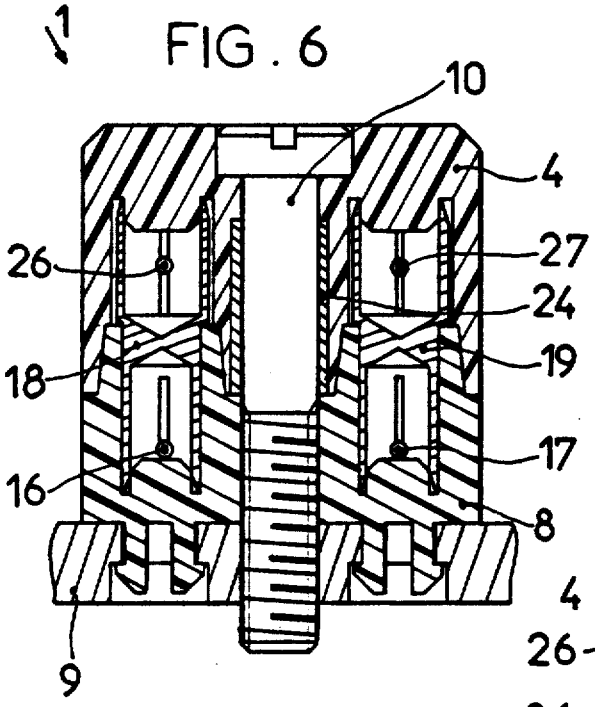
FIGS. 6 and 7 are the same as FIGS. 2 and 3, respectively, but with the connectors each closed on two pairs of wires.

FIGS. 4 and 6 illustrate the use of this connector 1. Starting with the connector 1 equipped as in FIG. 2 the user unscrews the screw 10' completely and separates the parts 4 and 8 from each other. The spacers 20 and 21 are removed and discarded.

Then the wires 16 and 17 are inserted in the lower sleeves 14 and 15, and the part 4 is put atop the part 8 and the screw 10' tightened. This forces the tubes 18 and 19 down to cut through the insulation on these wires 16 and 17 and cause the metal of the sides of the lower slots to bite into the wire 16 and 17. This action solidly lodges the tubes 18 and 19 on the bosses 22. It is then possible to reverse the screw 10 and take off the top 4 as indicated in FIG. 4 leaving the wires 16 and 17 in good mechanical and electrical contact with the tubes 18 and 19.

Subsequently the wires 26 and 27 are fitted all the way into the guide passages 12 and 13 and the upper part 4 is again screwed tightly down on the lower part 8. This action causes the wires 26 and 27 to lodge solidly in the upper slots of the tubes 18 and 19 and leaves the parts in the position shown in FIG. 6.

It is relatively easy to disconnect the wires 26 and 27 from the tubes 18 and 19. The screw 10' is withdrawn, the top part 4 lifted off, and the wires 26 and 27 pulled up parallel to the tube axes A off these tubes 18 and 19. Thus these wires 26 and 27 must be individually disconnected and cannot be disconnected as a pair.

Figure 3:
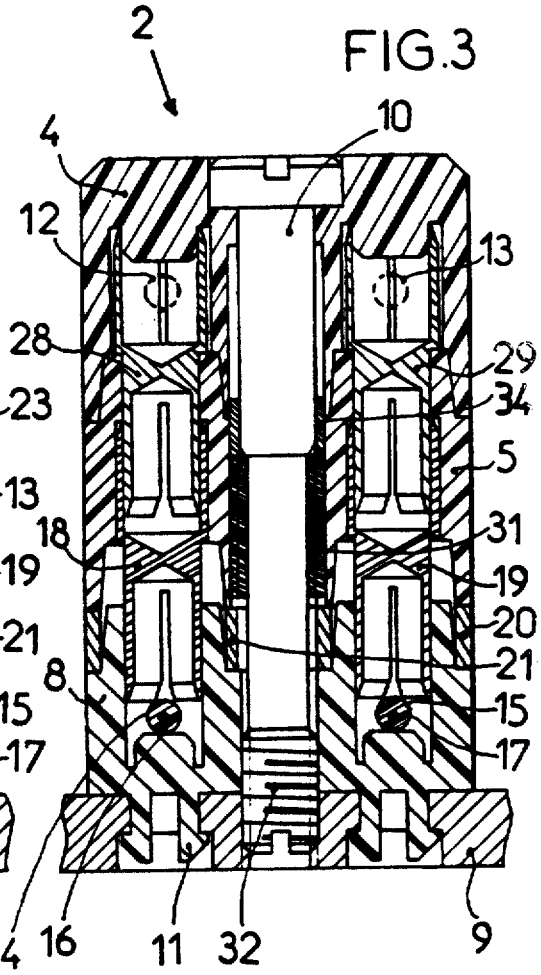
Figure 5:
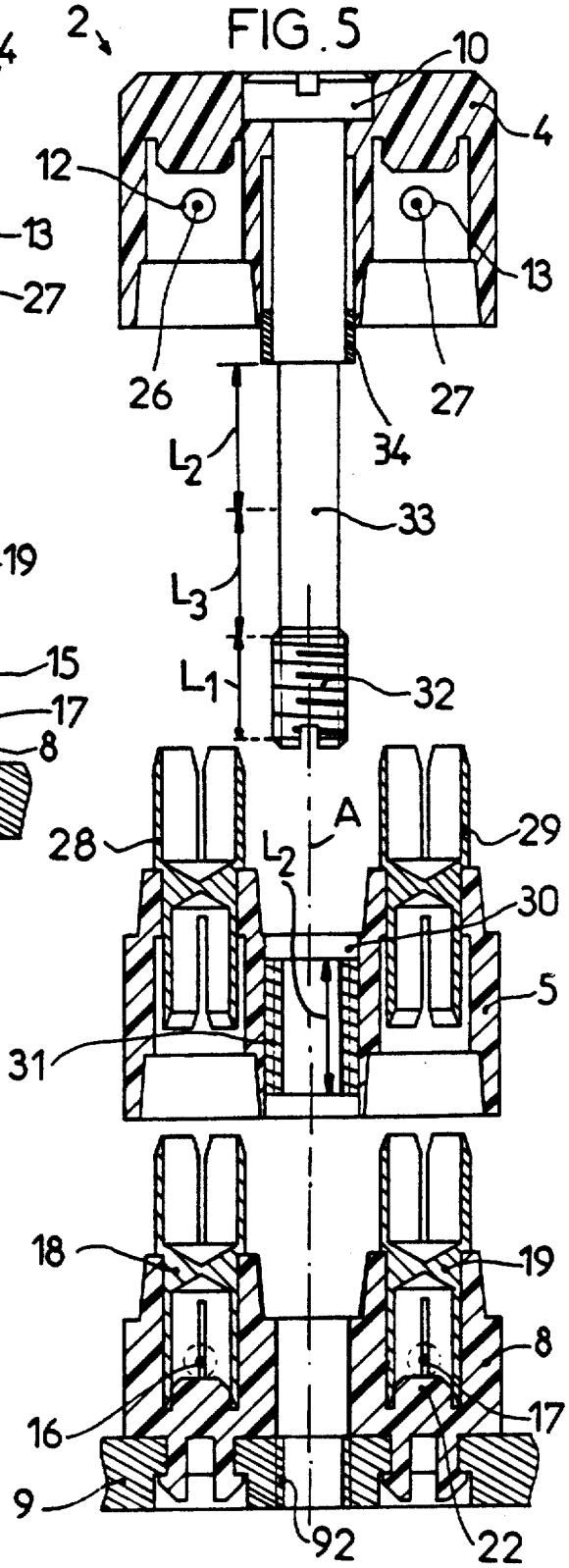
Figure 7:
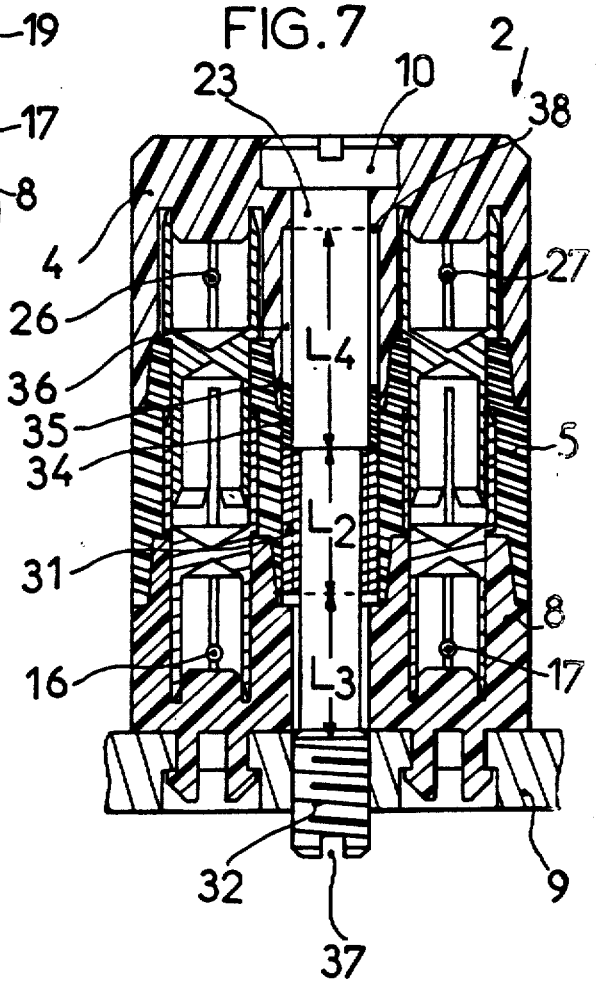

The connector 2 of FIGS. 3, 5, and 7 does, however, allow the disconnection of the pair 26, 27 together. To this end a middle part 5 is used having a three hole configuration like the parts 4 and 8 and fitted in its two side bores with stepped tubes 28 and 29 identical to the tubes 18 and 19. The small-diameter slotted lower ends of the tubes 28 and 29 can therefore fit with good electrical contact inside the large-diameter upper ends of the tubes 18 and 19. The central axial hole 30 of the intermediate part 5 is provided with an internally threaded metallic sleeve 31 whose pitch and inside diameter are the same as the threaded hole 92 of the rail 9.

In this arrangement the screw has a lower threaded end 32 complementary to the bore 92 and sleeve 31 and of a length $L_1$, an intermediate unthreaded portion 33 of a diameter that can pass with clearance through the sleeve 31 and of a length equal to the length $L_2$ of the sleeve 31 plus a length $L_3$ that is slightly greater than the length $L_1$ of the portion 32, and the unthreaded shank 23 which is of somewhat greater diameter than the portion 33. In addition this screw 10 carries at the lower end of the portion 23 a ring 34 forming a shoulder 35 axially engageable with the shoulder 38 of the stepped bore 36 for the screw 10. The lower end of the ring 34 is spaced below the shoulder 38 in the fully inserted position of the screw 10 by a distance $L_4$ slightly greater than the distance $L_3$.

The connector 2 works as follows:

As seen in FIG. 3 the device is delivered with the disposable spacers 20 and 21. To get rid of these the screw 10 is unscrewed until its threaded end 32 comes out of the bore 92. The screw 10 along with the two parts 4 and 5 is then pulled up off the lower part 8. The spacers 20 and 21 are discarded and the wires 16 and 17 are fitted into the lower guide sleeves 14 and 15.

Then the assembly 4, 5 is fitted back atop the part 8 and the screw 10 is screwed tight down into the bar 9, locking in the wires 16 and 17 and leaving the lower ends of the tubes 18 and 19 wedged over the bosses 22. Normally these wires 16 and 17 are the feed. Subsequently the screw 10 is backed out of the bar 9 and the parts 4 and 5 are again withdrawn, carrying with them the tubes 28 and 29 but leaving the tubes 18 and 19 in place in the part 8.

A screwdriver is then inserted into the slot 37 at the lower end of the screw 10 and the thread of the portion 32 is engaged in that of the sleeve 31 fixed in the part 5. Subsequent screwing of the portion 32 into the sleeve 31 pushes the shoulder 35 against the shoulder 38 and pushes the upper part 4 up off the intermediate part 5 and its tubes 28 and 29, leaving the assembly in the position of FIG. 5. In this position the wires 26 and 27 are pushed into the upper sleeves 12 and 13 and the part 4 is fitted down onto the part 5 and it is fitted in turn on the lower part 8. The screw 10 is rotated by its head so that first its threaded end 32 moves through the sleeve 31 and then into the bore 92. The entire assembly is then compressed together as seen in FIG. 7 to lock the wires 26 and 27 into the upper sleeves 28 and 29. Normally the wires 26 and 27 are the outgoing wires to the load.

To uncouple the load from the feed it is merely necessary to back the screw 10 out of the bore 92 and pull off the top assembly comprised of this screw 10, the parts 4 and 5, and the sleeves 28 and 29. This makes it extremely easy to test or work on a two-wire line while disconnected from its feed, and to reconnect it in one simple operation as the wires 26 and 27 will remain solidly anchored in the removable assembly 4, 5, 28, 29, and 10.

Figure 8:
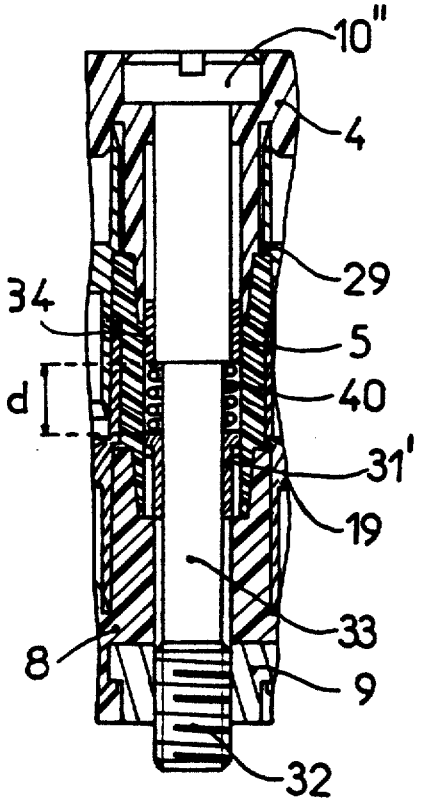
FIG. 8 is a section similar to a detail of FIG. 7 but illustrating a variant on the structure of FIG. 7.

FIG. 8 shows a variant on the connector 2 which eliminates the need for the screw slot 37. Here the screw 10'' is permanently urged upward away from the bar 9 by a spring 40 braced upward against the lower end of the shank portion 23 and [donwnward] *downward* against the top of the sleeve 31'. Thus as soon as the portion 32 leaves the bore 92 it will snap up and engage the sleeve 31' so it can be screwed therein by the slot on the screw head.

Figure 9:
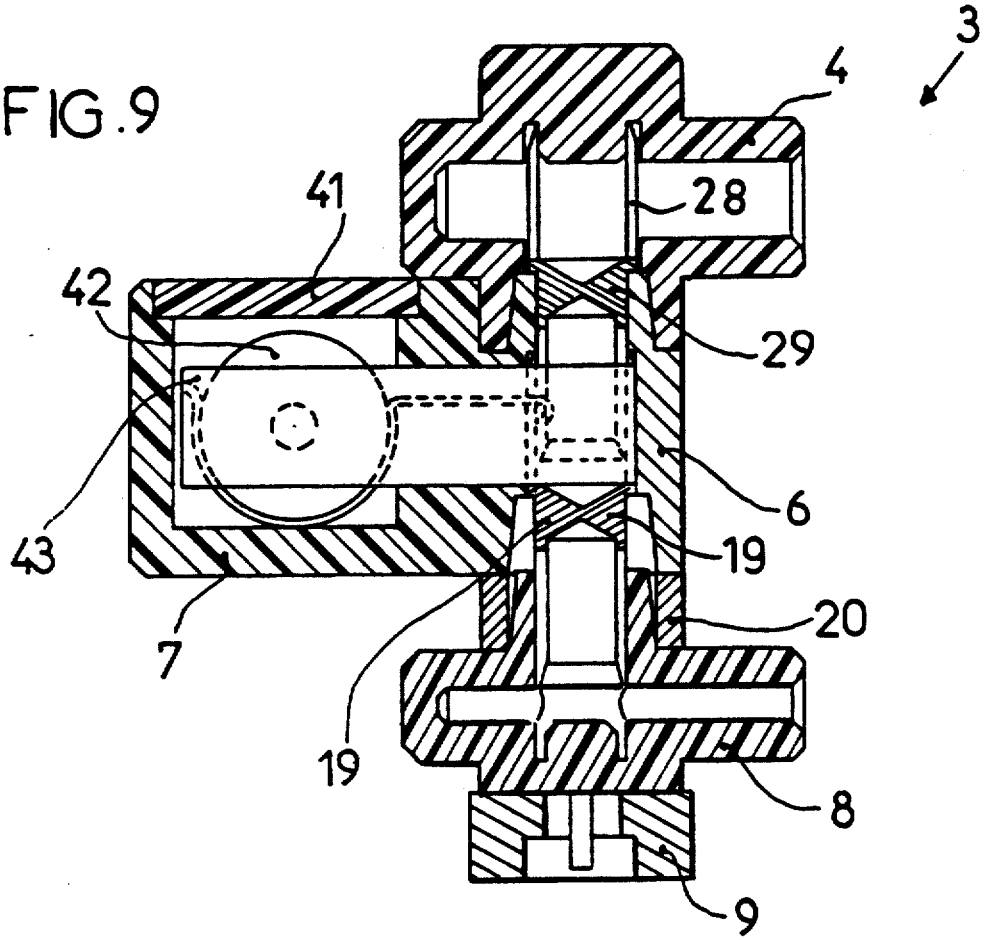
FIGS. 9 and 10 are sections taken respectively along the planes indicated at IX—IX and X—X of FIG. 1.
Figure 10:
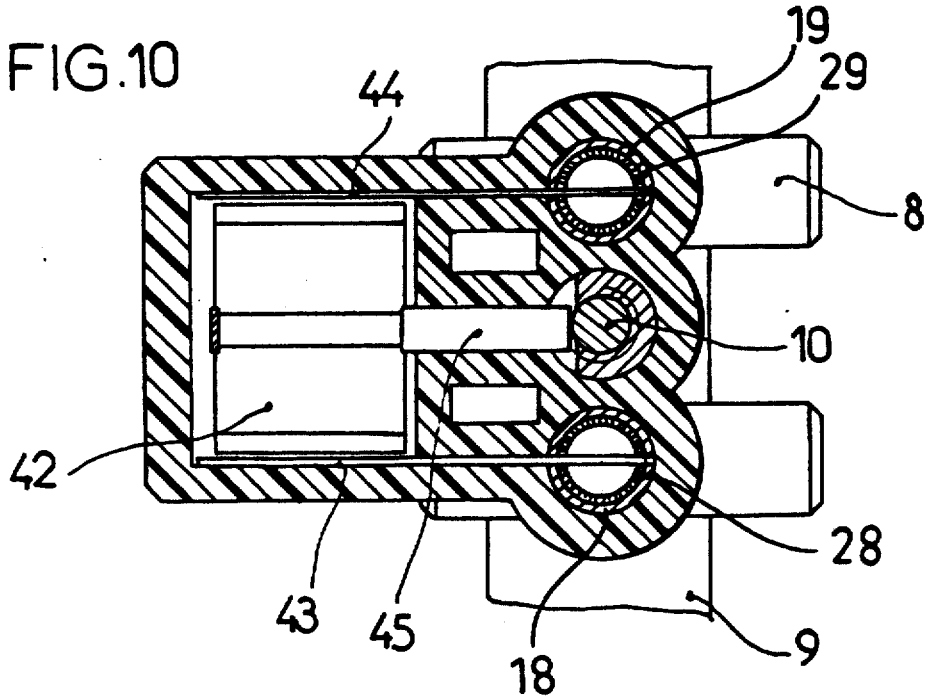

The connector 3 is shown in FIGS. 9 and 10. The extension 7 is molded integrally with the part 6, has a removable cover 41, and contains a lightning arrester 42 provided with terminals 43 and 44 engaged in the lower slots of the respective upper tubes 28 and 29 and in the upper slots of the respective lower tubes 18 and 19, and in fact serving to keep them from rotating in the respective bores. In addition this device 42 has a central contact 45 bearing against the metallic screw 10 which is a very good ground. Thus any sudden overvoltage in either of the lines 16, 26 or 17, 27 will be shunted to ground. Otherwise the connector 3 is used identically to the connector 2.

I claim:

1. A self-stripping electrical connector comprising:

a grounded bar [formed with at least one threaded bore];

a dielectric lower support part secured to the bar [over the bore] and formed with two adjacent outwardly open lower guide passages;

a pair of generally parallel and electrically conductive lower tubes having lower ends formed with slots aligned with the respective lower passages and upper ends also formed with slots;

guides on the lower support part carrying the tubes for movement toward and away from the bar with the lower-end slots aligned with the respective lower passages;

a dielectric upper support part overlying the lower part and formed with two adjacent outwardly open upper guide passages aligned with the upper-end slots of the respective tubes;

means including a screw engageable through both of the parts [and into the bore of the bar] for pressing the upper part down on the lower part and for pressing the tubes down in the lower part and thereby wedging wires in the passages and aligned with the respective slots into the tubes.

2. The self-stripping electrical connector defined in claim 1, further comprising means for retaining the screw in the upper part against removal therefrom.

3. The self-stripping electrical connector defined in claim 1, further comprising:

a dielectric intermediate support part secured between the upper and lower parts; and a pair of generally parallel and electrically conductive upper tubes fixed in the intermediate part having lower ends engageable in the upper ends of the lower tubes and upper ends formed with slots aligned with the respective upper passages and upper ends also formed with slots, the screw passing through the intermediate part between the tubes.

4. The self-stripping electrical connector defined in claim 3, further comprising a threaded sleeve surrounding the screw and fixed in the intermediate part, the screw having a head capable of bearing toward the bar on the upper part, a threaded lower end threadedly engageable with the bar and with the threaded sleeve, a small-diameter shank between the head and the threaded end capable of sliding through the sleeve, and a shoulder engageable away from the bar against the upper part on threaded engagement of the threaded end in the sleeve, whereby screwing the threaded end up into the sleeve pushes the upper part off the intermediate part.

5. The self-stripping electrical connector defined in claim 3, further comprising an overvoltage protector carried on the intermediate part and having respective input conductors connected to the upper tubes and an output conductor normally in electrical contact with the screw.

6. The self-stripping electrical connector defined in claim 5 wherein the protector is fixed to the intermediate part.

7. The self-stripping electrical connector defined in claim 6 wherein the intermediate part is unitarily formed with a housing containing the protector.

8. A self-stripping electrical connector comprising:

a [grounded] bar formed with at least one threaded bore;

a dielectric lower support part secured to the bar over the bore and formed with a central throughgoing hole, a pair of upwardly open side holes substantially parallel to and flanking the central hole, an upwardly directed boss in each of the side holes, and respective lower wire guides forming respective guide passages opening laterally into the side holes generally level with an uppermost part of the respective boss;

respective generally parallel lower tubes having large-diameter lower ends formed with slots aligned with the respective lower guide passages and small-diameter upper ends also formed with slots, the lower ends of the tubes being slidable in the respective side holes and engageable over the respective boss therein;

a dielectric upper support part overlying the lower part and formed with a central throughgoing hole, a pair of downwardly open side holes substantially parallel to and flanking the respective central hole and of generally the same diameter as the upper tube ends, and respective upper wire guides forming respective guide passages opening laterally into the respective upper side holes in line with the slots of the upper ends; and means including a screw engageable through the center holes of both of the parts and into the bore of the bar for pressing the upper part down on the lower part and for pressing the tubes down in the lower part and thereby wedging wires in the passages and aligned with the respective slots into the tubes.

9. A self-stripping electrical connector comprising:

a grounded bar [formed with at least one threaded bore];

a dielectric lower support part secured to the bar [over the bore] and formed with a central throughgoing hole, a pair of upwardly open side holes substantially parallel to and flanking the central hole, an upwardly directed boss in each of the side holes, and respective lower wire guides forming respective guide passages opening laterally into the side holes generally level with an uppermost part of the respective boss;

respective generally parallel lower tubes having large-diameter lower ends formed with slots aligned with the respective lower guide passages and small-diameter upper ends also formed with slots, the lower ends of the tubes being slidable in the respective side holes and engageable over the respective boss therein;

a dielectric intermediate support part secured to the bar [over the bore] and formed with a central throughgoing hole, and a pair of throughgoing side holes substantially parallel to and flanking the respective central hole;

respective generally parallel upper tubes fixed in the intermediate part and having large-diameter lower ends and small-diameter upper ends formed with slots;

a dielectric upper support part overlying the lower part and formed with a central throughgoing hole, a pair of downwardly open side holes substantially parallel to and flanking the respective central hole and of generally the same diameter as the upper tube ends, and respective upper wire guides forming respective guide passages opening laterally into the respective upper side holes;

[an overvoltage protector carried on the intermediate part and having respective input conductors connected to the upper tubes and an output conductor normally in electrical contact with a screw; and]

means including a screw engageable through the center holes of all of the parts [and into the bore of the bar] for pressing the upper part down on the intermediate part, for pressing the intermediate part down on the lower part, and for pressing the tubes into one another and down in the lower part and thereby wedging wires in the passages and aligned with the respective slots into the tubes; *and*

*an overvoltage protector carried on the intermediate part and having respective input conductors connected to the upper tubes and an output conductor normally in electrical contact with the screw.*

* * * * *